United States Patent [19]
Grantz et al.

[11] Patent Number: 5,997,357
[45] Date of Patent: Dec. 7, 1999

[54] LOW PROFILE IN-SHAFT CONNECTOR

[75] Inventors: Alan Lyndon Grantz, Aptos; Marten Fredrick Byl, Los Gatos, both of Calif.; Gary Alfred Treleven, Yukon, Okla.

[73] Assignee: Seagate Technology, Inc., Scotts Valley, Calif.

[21] Appl. No.: 09/059,888

[22] Filed: Apr. 14, 1998

Related U.S. Application Data

[60] Provisional application No. 60/064,592, Nov. 6, 1997.

[51] Int. Cl.⁶ ..................................................... H01R 21/00
[52] U.S. Cl. ........................................... 439/660; 439/592
[58] Field of Search ..................................... 439/685, 682, 439/687, 181, 283, 660

[56] References Cited

U.S. PATENT DOCUMENTS 5,131,858  7/1992  Heimbrock .............................. 439/181

*Primary Examiner*—Neil Abrams
*Assistant Examiner*—Eugene G. Byrd
*Attorney, Agent, or Firm*—Flehr Hohbach Test Albritton & Herbert LLP

[57] ABSTRACT

A low-profile in-shaft connector including a female connector (82) and a male connector (90) for electrically connecting a power source to the electrical windings of a motor for rotating a magnetic disc storage system. The female connector (82) includes a sleeve extension (50) that extends down and around the three pins (72, 74, 76) of the female connector and engages the outward sides of the pins in order to prevent lateral deflection of the pins and thereby increase the spring biasing force of the electrical connection between the male and female connector components.

11 Claims, 6 Drawing Sheets

LOW PROFILE IN-SHAFT CONNECTOR

CROSS-REFERENCE TO RELATED APPLICATION

This invention is based on U.S. Provisional Patent Application, Ser. No. 60/064,592, filed Nov. 6, 1997, under the same title assigned to the assignee of this application and incorporated herein by reference.

FIELD OF THE INVENTION

The present invention relates to magnetic disc drive storage systems and, more particularly, to a low profile in-shaft male connector for electrically coupling with a female connector to provide power to the motor of a magnetic disc drive.

BACKGROUND OF THE INVENTION

Seagate Technology of Scotts Valley, Calif., USA, the assignee company of the applicant herein, has made and sold in-shaft connectors as part of a spindle assembly for rotatably supporting magnetic disc drives for use in personal computers. The in-shaft connectors sold by Seagate included a set of three electrical prongs extending downwardly within the hollow interior of the spindle assembly shaft. The width of the hollow interior of the shaft provided sufficient room for a female connector to be inserted up into the shaft and connected to the three extended prongs in a manner where the female component completely surrounded the extended prongs. Laterally displaceable conductive elements engaged the extended prongs and the spring force of the conductive elements ensured a solid electrical connection.

While these male/female connectors have worked satisfactorily, it has been discovered that they tend to lose some of their spring elasticity, which can weaken the electrical integrity of the connection. They also tend to require a wide profile spindle shaft to accommodate the female connector, which limits the amount of room between the connector and the motor for the bearing components.

The present invention improves upon this prior art connector design.

SUMMARY OF THE INVENTION

Briefly described, the present invention comprises a connector for a spindle assembly of a magnetic disc storage system for electrically connecting a motor associated with the spindle assembly with a source of electrical power. The connector includes a male connector component within the spindle assembly, including three pins electrically connected to the electrical windings of the motor assembly. The male connector further includes a sleeve immediately around and engaging the outer sides of the pins in a manner preventing outward deflection of the pins. The connector also includes a female connector component with three conductive extensions, one for electrical connection to each of the electrical pins of the male connector. Each conductive extension has sufficient elasticity to permit deflection of the conductive extension. The three conductive extensions are arranged in spaced relationship so that they fit within the three electrical pins of the male connector and engage each pin from an inner side thereof.

According to an aspect of the invention, the conductive extensions have sufficient elasticity to create a spring biasing force along the length of the conductive extensions, which biases the conductive extensions against the electrical pins when the male and female connector components are joined.

According to another aspect of the invention, each conductive extension includes an electrical contact surface that is shallower than the width of an electrical pin, so that the contact surface does not extend around the electrical pin and contact the inner surface of the sleeve.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein.

DETAILED DESCRIPTION OF A PREFERRED EMBODIMENT

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Figure 1:
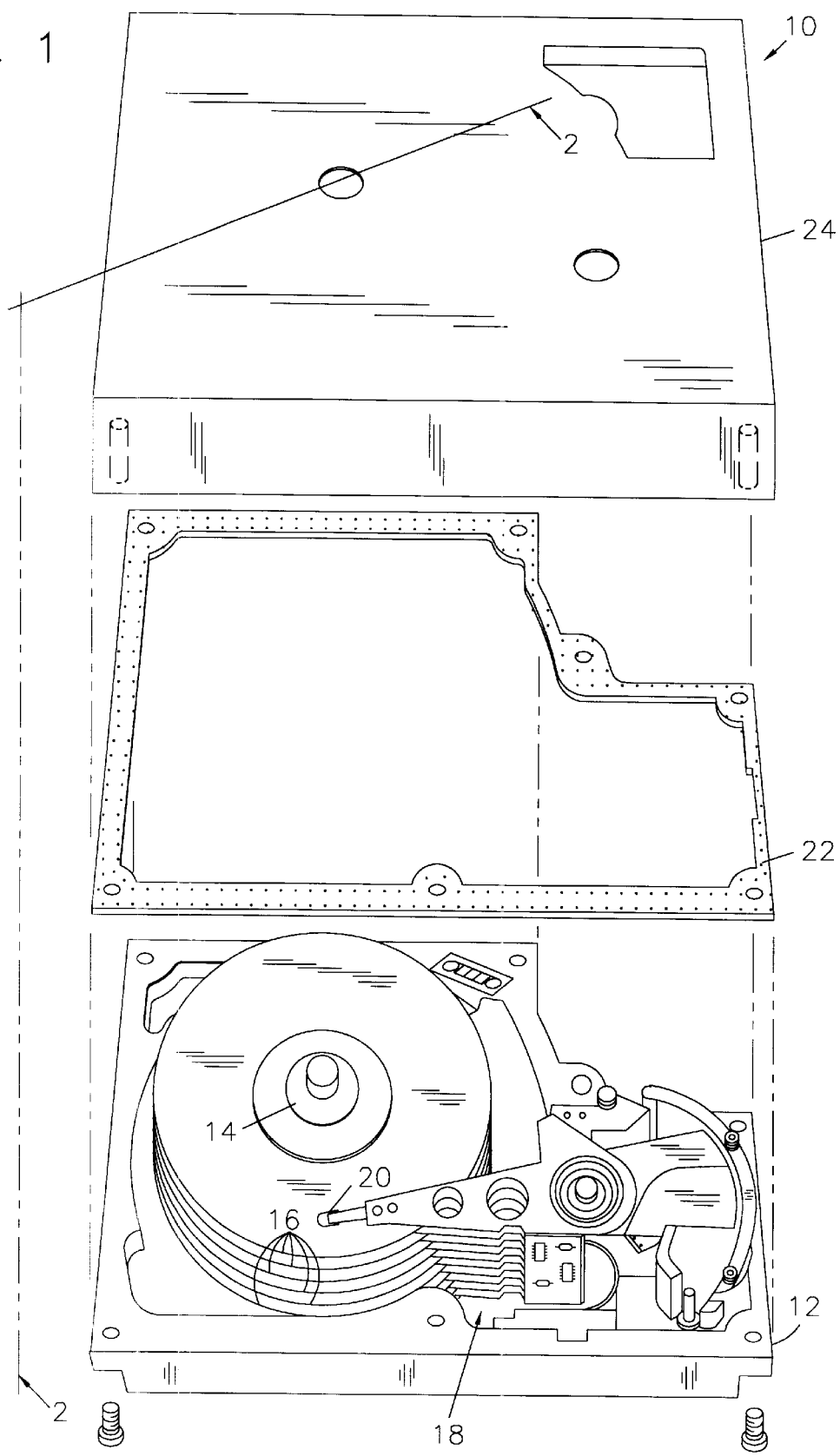
FIG. 1 is an exploded pictorial view of a magnetic disc drive storage system including a fluid dynamic bearing in accordance with the invention.

FIG. 1 is an exploded perspective view of a magnetic disc drive storage system in which the present fluid dynamic bearing could be used. In the example to be discussed below, the use of the fluid dynamic bearing will be shown in conjunction with a spindle motor. However, this bearing cartridge is not limited to use with this particular design of a disc drive, which is shown only for purposes of the example. Given the stability which this invention achieves, it could also potentially be used to support the actuator for rotation. The bearing cartridge also has numerous other uses outside the field of disc drives.

In this particular example, the storage system 10 includes a housing base 12 having spindle motor 14 which rotatably carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a radially diferentiated track on the surface of the discs 16. This allows the transducers 20 to read and write magnetically encoded information on the surfaces of discs 16 at selected locations. The discs rotate at very high speeds, several thousand RPM, in order to maintain each transducer flying over the surface of the associated disc. In present day technology, the spacing distance between the transducer and the rotating disc surface is measured in microinches; thus it is absolutely essential that the disc does not tilt or wobble.

Figure 2:
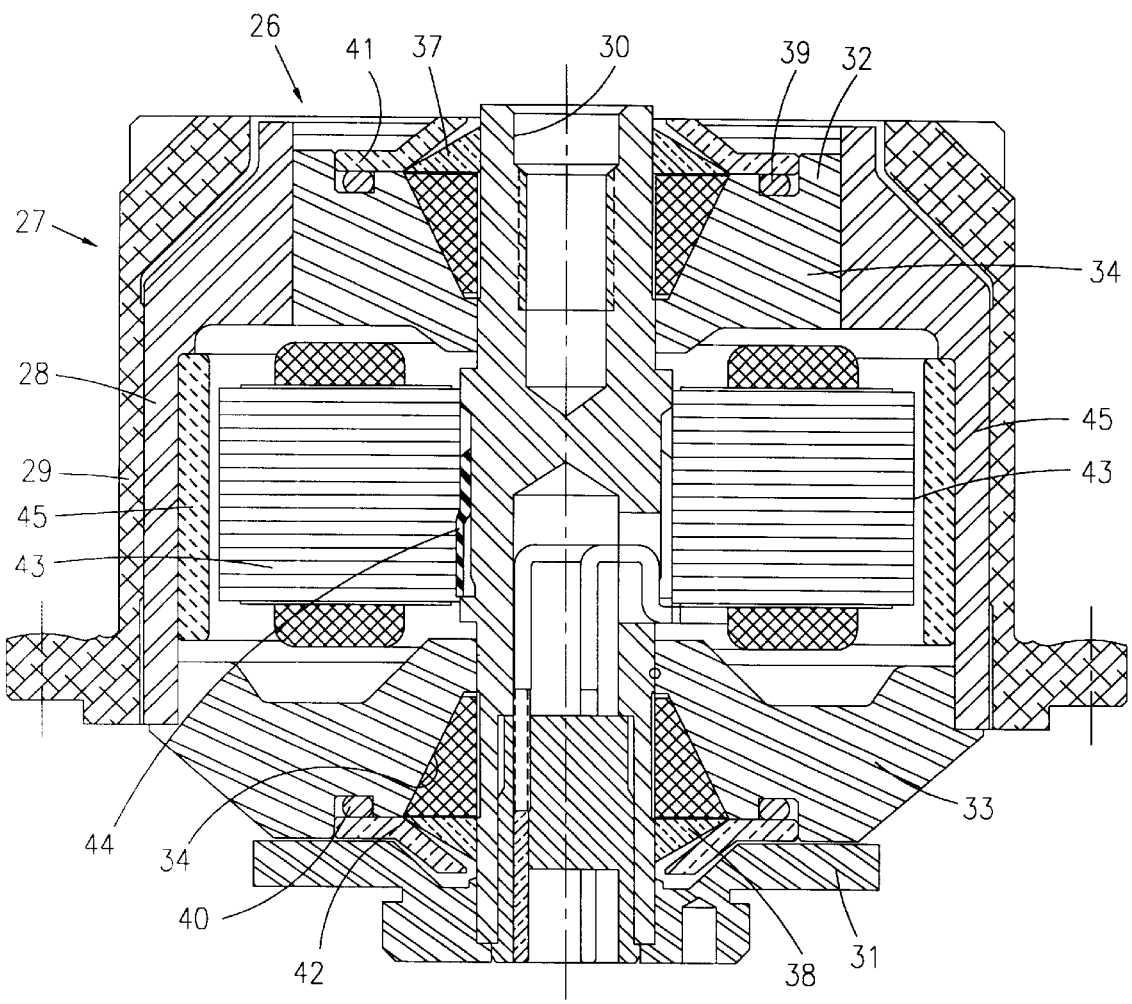
FIG. 2 is a sectional view of the spindle assembly of the present invention.
Figure 3:
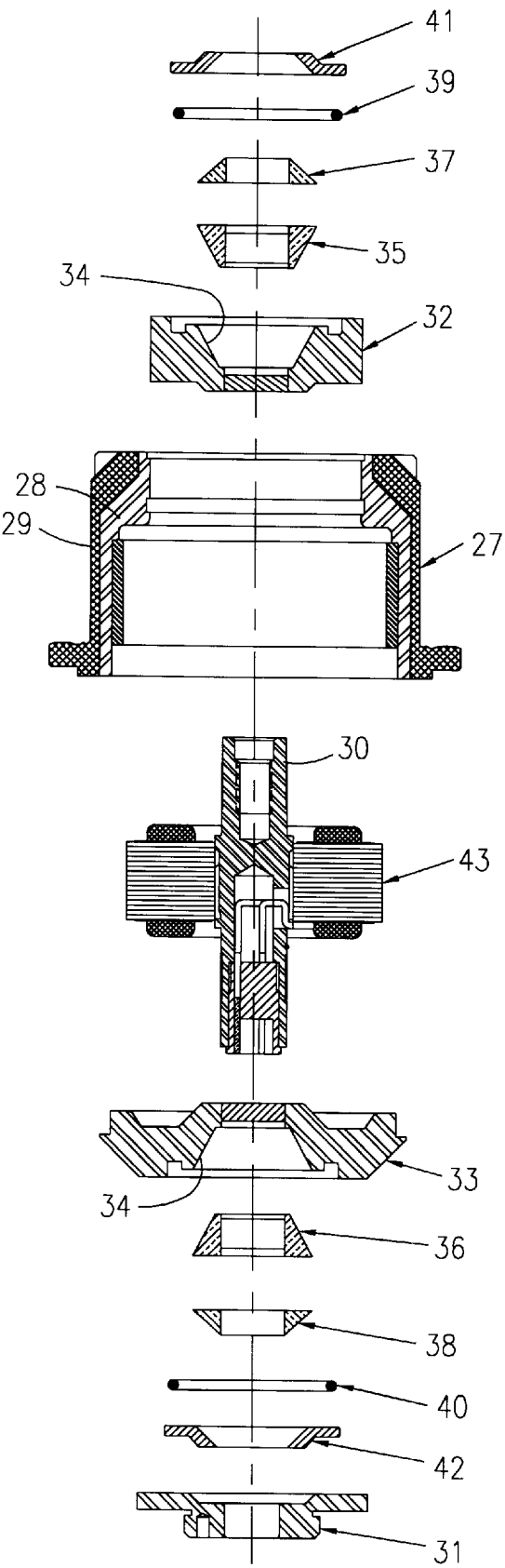
FIG. 3 is an exploded view of the spindle assembly of the present invention.

FIGS. 2 and 3 show the design of a bearing cartridge 26 that is part of the spindle motor identified in FIG. 1. Bearing cartridge 26 supports a spindle hub assembly 27, which is comprised of an upper hub back iron 28 and a top hub cover 29. Bearing cartridge 26 includes a central spindle shaft 30 that is press fit within a bottom mounting flange 31 and which is threadably secured to base 12. Bearing cartridge also includes an upper bearing seat 32 and a lower bearing seat 33, which both include conical bearing surfaces 34. Bearing surfaces 34 engage a pair of bearing cones 35, 36, which are identical and are discussed in more detail later.

Bearing cartridge 26 also includes upper and lower seal cones 37, 38, seal rings 39, 40, and shield seals 41, 42. Seal cones 37, 38 are press fit onto spindle shaft 30 and shield seals 41, 42 are press fit onto bearing seats 32, 33.

The spindle motor includes stator windings 43, which are secured about spindle shaft 30 by means of a clip 44, and magnets 45, which are secured to back iron 28.

Figure 4:
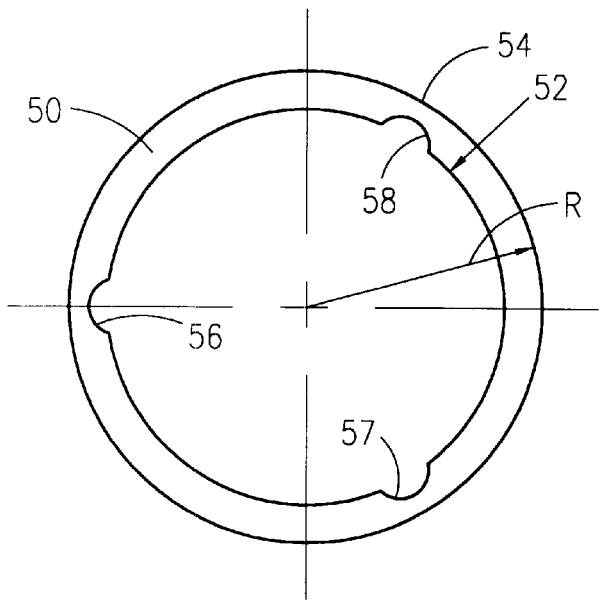
FIG. 4 is a top view of the sleeve extension for the male connector of the spindle assembly.
Figure 5:
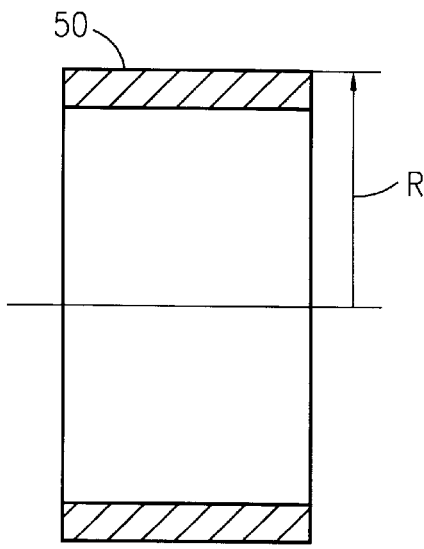
FIG. 5 is a side view of the sleeve extension.

Referring to FIGS. 4 and 5, the female connector component of the present invention includes a circular sleeve extension 50 that has an inner edge 52 and an outer edge 54. The radius R of outer edge 54 is equal to the inside radius of the spindle shaft in which the female connector is secured. For a typical commercial spindle assembly, sleeve 50 would be approximately 2 mm in height. Sleeve 50 includes three scalloped sections 56, 57, 58, which are spaced about the sleeve at 120° increments. Scallops 56, 57, 58 are discussed in more detail later. Sleeve 50 is used in combination with an earlier connector assembly made and sold by Seagate in order to achieve the improved connector of the present invention.

Figure 6:
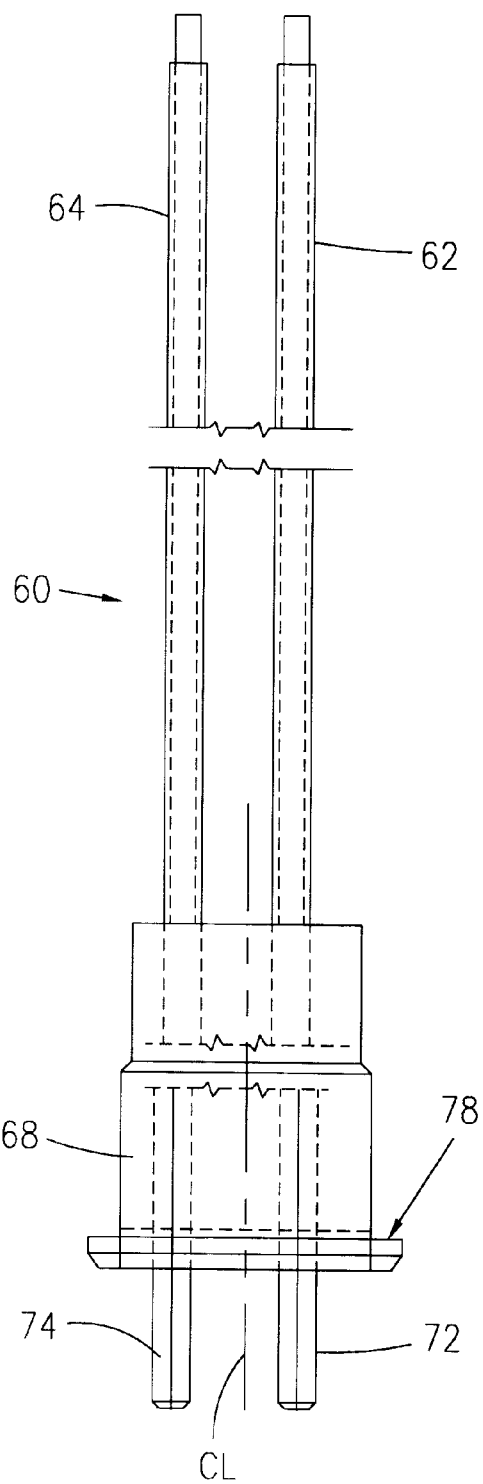
FIG. 6 is a side elevation view of the male connector of the spindle assembly shown prior to removal of its flange and addition of its sleeve extension.
Figure 7:
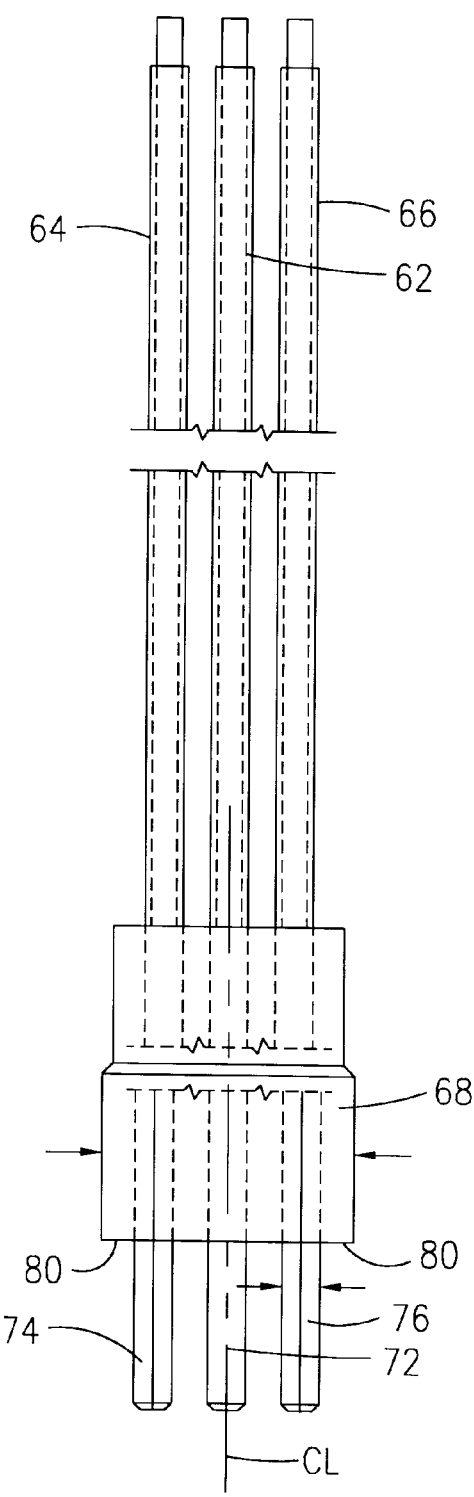
FIG. 7 is a front elevation view of the male connector of FIG. 6.

Referring to FIGS. 6 and 7, the male connector 60 shown in FIG. 6 is that of a prior art design of Seagate, which is modified to produce the improved connector of the present invention. Connector 60 includes three leads 62, 64, 66 that are secured at their lower ends within a connector block 68. At their ends within connector block 68, leads 62, 64, 66 are connected to three pins 70, 72, 74, which are also secured within connector block 68. Pins 72, 74, 76 are spaced 120° apart about the centerline CL of the connector.

Figure 8:
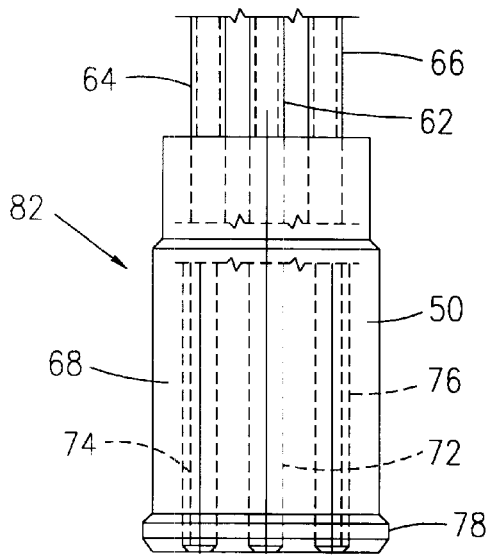
FIG. 8 is a front elevation view of the male connector of the spindle assembly of the present invention.

For the connector of the present invention, the flange 78 is removed, as shown in FIG. 7, and sleeve 50 is positioned around pins 72, 74, 76 and is welded to the lower edge 80 of connector block 68. Then flange 78 is re-welded at the lower edge of sleeve 50, to complete the modification of the male connector. The resulting male connector 82 is shown in FIG. 8. Alternatively, connector 82 can be machined or molded initially as a monolithic unit. In addition, it is possible to eliminate flange 78 and allow the shoulder of connector 82 to seat against the inside narrow diameter step 84 of shaft 30.

Figure 9:
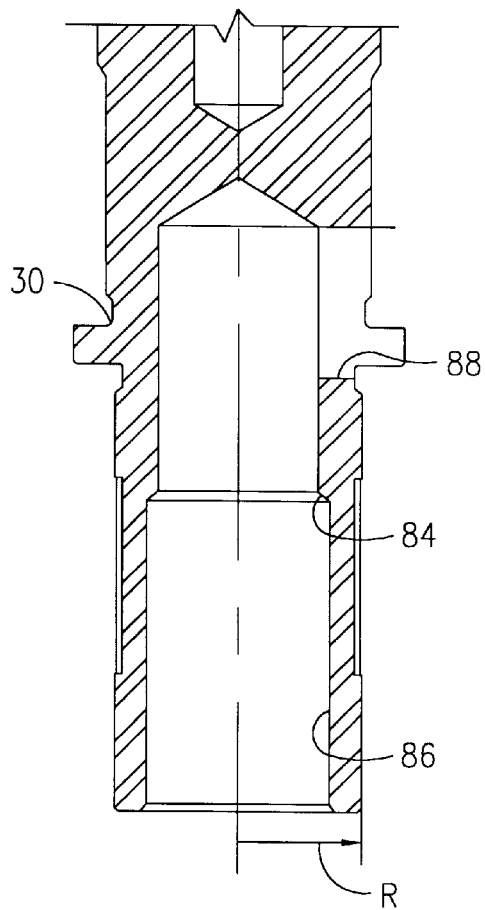
FIG. 9 is a sectional view of the spindle shaft.
Figure 10:
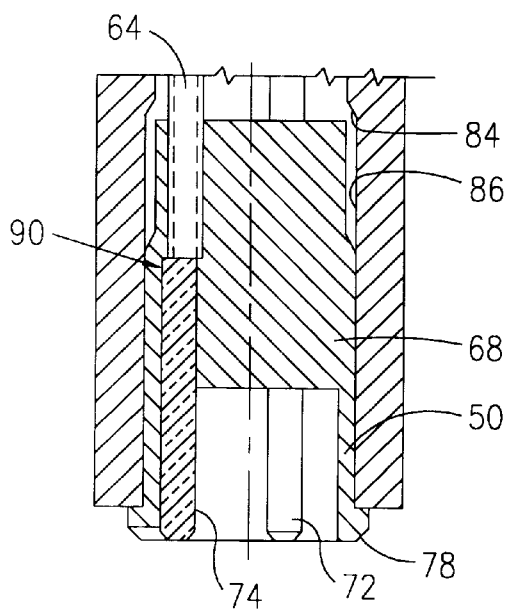
FIG. 10 is a sectional view of the connector and the spindle shaft, taken along the line 10—10 of FIG. 11.
Figure 11:
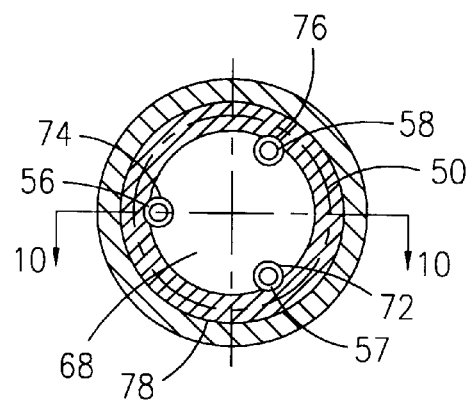
FIG. 11 is a cross-sectional view of the connector and spindle shaft.

FIG. 9 shows spindle shaft 30, in which male connector 82 is secured with a press fit connection, as best seen in FIG. 10. The inside narrow diameter step 84 defines a large diameter area 86 for receiving male connector 82. Male connector 82 is inserted into area 86 until its flange 78 buts against the lower edge of sleeve 50, which is then part of connector block 68. Shaft 30 also includes a side opening 88 (FIG. 9), which provides access for leads 62, 64, 66 into the electrical windings within the motor enclosure. FIG. 10 also shows the interior connection 90 between lead 64 and pin 74. Pins 72, 74, 76 can be considered male connector means for presenting electrical connections from the windings of the motor, which are then joined with female connector means discussed later.

Referring to FIG. 1, it can be seen that the scalloped sections 56, 57, 58 provide space for pins 72, 74, 76, which allows sleeve 50 to partially enclose each pin and provide lateral support to prevent the pins from bending laterally outwardly and from twisting in rotation upon connection to the female connector. In this manner, it should be appreciated that sleeve 50 is immediately around the pins and engages the outer sides of the pins in a manner preventing their outward deflection and rotation.

Figure 12:
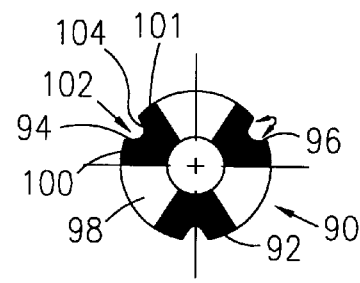
FIG. 12 is a sectional view of the female connector component.

FIG.12 shows a female connector 90, which includes three upright deflecting contact supports 92, 94, 96 and a base 98. Each upright extension is somewhat V-shaped and includes a pair of side walls 100, 101, which together form an outwardly facing V-shaped receptacle 102. A corresponding V-shaped conductor piece 104 is secured within receptacle 102 of each upright extension.

Figure 13:
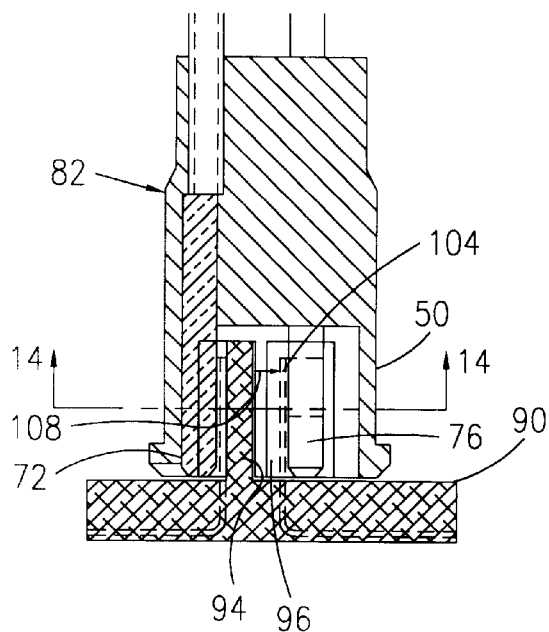
FIG. 13 is a sectional view of the male and female connector components shown interconnected.
Figure 14:
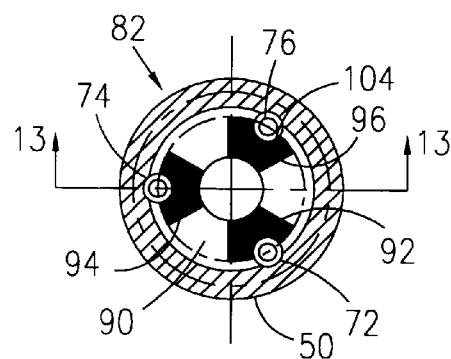
FIG. 14 is a sectional view along the line 14—14 of FIG. 13 of the male and female connectors.

As shown in FIGS. 13 and 14, male connector 82 and female connector 90 are joined in a manner where contact supports 92, 94, 96 are positioned within pins 72, 74, 76 and in a manner where contact supports 92, 94, 96 create a lateral spring force, indicated by arrows 108 in FIG. 13, against pins 72, 74, 76. This spring force is distributed along the height of the contact supports, which thereby improves the spring bias of the conductive pieces 104 against the conductive pins, ensuring a solid connection therebetween. The upper ends of conductive pieces 104 have formed bends to ensure metal-to-metal contact. Earlier designs of Seagate utilized a spring biased conductive element that deflected laterally and had a short spring element with a lesser spring force. The connector of the present invention improves the spring force by distributing it along the height of the connector and by allowing the connector to deflect along its height.

When the contact supports deflect and generate a spring biasing force, the sleeve 50 prevents the pins from laterally deflecting outwardly as well, which further enhances the solid connection between the pins and the conductive elements of the female connector.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto when read and interpreted according to accepted legal principles such as the doctrine of equivalents and reversal of parts.

What is claimed is:

1. A connector for a spindle assembly of a magnetic disc storage system for electrically connecting a motor associated with the spindle assembly with a source of electrical power, comprising a male connector component within the spindle assembly, including at least three pins electrically connected to the electrical windings of the motor assembly, the male connector further including a sleeve immediately around and engaging the outer sides of the pins in a manner preventing outward deflection of the pins, a female connector component with at least three connector contact supports, one for electrical connection to each of the electrical pins of the male connector, each connector contact support having sufficient elasticity to permit deflection of the connector contact support, the at least three connector contact supports being arranged in spaced relationship so that they fit within the three electrical pins of the male connector and engage each pin from an inner side thereof.

2. The connector of claim 1 wherein, the connector contact supports have sufficient elasticity to create a spring biasing force along the length of the connector contact supports, which biases the connector contact supports against the electrical pins when the male and female connector components are joined.

3. The connector of claim 1 wherein, each connector contact support includes an electrical contact surface that is shallower than the width of an electrical pin, so that the contact surface does not extend around the electrical pin and contact the inner surface of the sleeve, the male pins thereby being further biased against the sleeve.

4. A connector for a spindle assembly for electrically connecting a motor associated with the spindle assembly with a source of electrical power, comprising a male connector component within the spindle assembly, including at least three pins electrically connected to the electrical windings of the motor assembly, a female connector component with at least three connector contact supports, one for electrical connection to each of the electrical pins of the male connector, each connector contact support having sufficient elasticity to permit deflection of the connector contact support, the connector contact supports being arranged in spaced relationship so that they fit within the electrical pins of the male connector and engage each pin from an inner side thereof, and wherein the connector contact supports have sufficient elasticity to create a spring biasing force along the length of the connector contact supports, which biases the connector contact supports against the electrical pins when the male and female connector components are joined.

5. The connector of claim 4 wherein, the male connector further includes a sleeve immediately around and engaging the outer sides of the pins in a manner preventing outward deflection of the pins.

6. The connector of claim 4 wherein, each connector contact support includes an electrical contact surface that is shallower than the width of an electrical pin, so that the contact surface does not extend around the electrical pin and contact the inner surface of the sleeve, the male pins thereby being further biased against the sleeve.

7. A connector for a spindle assembly of a magnetic disc storage system for electrically connecting a motor associated with the spindle assembly with a source of electrical power, comprising male connector means within the spindle assembly for presenting electrical connections from the motor, said means including at least three pins electrically connected to the electrical windings of the motor assembly and a sleeve immediately around and engaging the outer sides of the pins in a manner preventing outward deflection of the pins, female connector means for connecting with said male connector means, said female connector means including at least three connector contact supports, one for electrical connection to each of the electrical pins of the male connector, each connector contact support having sufficient elasticity to permit deflection of the connector contact support, the three connector contact supports being arranged in spaced relationship so that they fit within the three electrical pins of the male connector and engage each pin from an inner side thereof.

8. The connector of claim 7 wherein, the connector contact supports have sufficient elasticity to create a spring biasing force along the length of the connector contact supports, which biases the connector contact supports against the electrical pins when the male and female connector components are joined.

9. The connector of claim 7 wherein, each connector contact support includes an electrical contact surface means for engaging the electrical pins, said electrical contact surface means being shallower than the width of an electrical pin, so that the contact surface means does not extend around the electrical pin and contact the inner surface of the sleeve, the male electrical pins thereby being further biased against the sleeve.

10. The connector of claim 3 wherein, the connector contact supports have sufficient elasticity to create a spring biasing force along the length of the connector contact supports, which biases the connector contact supports against the electrical pins when the male and female connector components are joined.

11. The connector of claim 5 wherein, each connector contact support includes an electrical contact surface that is shallower than the width of an electrical pin, so that the contact surface does not extend around the electrical pin and contact the inner surface of the sleeve, the male pins thereby being further biased against the sleeve.

* * * * *